United States Patent
Geissbühler et al.

(10) Patent No.: US 11,821,692 B2
(45) Date of Patent: Nov. 21, 2023

(54) THERMOCLINE CONTROL METHOD

(71) Applicant: ETH Zürich, Zürich (CH)

(72) Inventors: Lukas Geissbühler, Bern (CH); Andreas Christian Haselbacher, Gockhausen (CH)

(73) Assignee: ETH Zürich, Zurich (CH)

( * ) Notice: Subject to any disclaimer, the term of this patent is extended or adjusted under 35 U.S.C. 154(b) by 167 days.

(21) Appl. No.: 17/263,031

(22) PCT Filed: Jul. 25, 2019

(86) PCT No.: PCT/EP2019/070051
§ 371 (c)(1),
(2) Date: Jan. 25, 2021

(87) PCT Pub. No.: WO2020/021014
PCT Pub. Date: Jan. 30, 2020

(65) Prior Publication Data
US 2021/0310747 A1 Oct. 7, 2021

(30) Foreign Application Priority Data
Jul. 26, 2018 (EP) .................................. 18185902

(51) Int. Cl.
*F28D 20/00* (2006.01)
(52) U.S. Cl.
CPC .. *F28D 20/0039* (2013.01); *F28D 2020/0069* (2013.01); *F28D 2020/0082* (2013.01)
(58) Field of Classification Search
CPC ......... F28D 20/0039; F28D 2020/0069; F28D 2020/0039; Y02E 60/14
See application file for complete search history.

(56) References Cited

U.S. PATENT DOCUMENTS

| 8,554,377 B2 | 10/2013 | Mathur et al. |
| 2011/0174296 A1 | 7/2011 | Kalina |

(Continued)

FOREIGN PATENT DOCUMENTS

| DE | 102011010669 A1 * | 8/2012 | ............ F24D 11/003 |
| FR | 3 020 666 A1 | 11/2015 | |

(Continued)

OTHER PUBLICATIONS

Written opinion for PCT/EP2019/070051 dated Oct. 28, 2019.
International search report for PCT/EP2019/070051 dated Oct. 28, 2019.

*Primary Examiner* — Eric S Ruppert
(74) *Attorney, Agent, or Firm* — Sughrue Mion, PLLC

(57) ABSTRACT

The present invention to provide a method of operating a thermal energy storage device comprising a body of heat transfer fluid, said body of heat transfer fluid comprising an upper temperature region comprising heat transfer fluid having a temperature above a upper threshold temperature, a lower temperature region comprising heat transfer fluid having a temperature below a lower threshold temperature and a thermocline region separating the upper and lower temperature regions and comprising heat transfer fluid having a temperature above a lower threshold temperature and below an upper threshold temperature, wherein during charging of the thermal energy storage device, heat transfer fluid is removed from the thermocline region of the body of heat transfer fluid and when the temperature of the heat transfer fluid being removed from the thermocline region of the body of heat transfer fluid rises above a maximum temperature, said heat transfer fluid being removed is brought to a temperature equal to or below said maximum temperature, wherein the maximum temperature is above the lower threshold temperature and/or wherein during discharging of the thermal energy storage device, heat transfer (Continued)

fluid is removed from the thermocline region of the body of heat transfer fluid and when the temperature of the heat transfer fluid being removed from the thermocline region of the body of heat transfer fluid falls below a minimum temperature, said heat transfer fluid being removed is brought to a temperature equal to or above said minimum temperature, wherein said minimum temperature is below the upper threshold temperature.

17 Claims, 11 Drawing Sheets

(56) References Cited

U.S. PATENT DOCUMENTS

2012/0118554 A1 5/2012 Mathur et al.
2017/0023263 A1* 1/2017 Tamaki .................... F24D 3/08

FOREIGN PATENT DOCUMENTS

| JP | 2004197958 A | * | 7/2004 |
| JP | 2004286307 A | * | 10/2004 |
| WO | 2013/151105 A1 | | 10/2013 |

* cited by examiner (a) Charging: before port switching (b) Charging: after port switching (c) Discharging: before port switching (d) Discharging: after port switching (a) Charging: before port switching (b) Charging: after port switching (c) Discharging: before port switching (d) Discharging: after port switching

Charging

Discharging

THERMOCLINE CONTROL METHOD

TECHNICAL FIELD

The present invention relates to a method of operating a heat storage device comprising a body of heat transfer fluid by controlling the flow of heat transfer fluid from and into the upper hot layer, the lower cold layer and the intermediate thermocline region of the body of heat transfer during the charging and discharging.

PRIOR ART

Heat storage devices enable dispatchable thermal energy from intermittent solar energy, which thermal energy can then be used on demand to power multiple useful processes, such as for example to provide electricity via a heat engine coupled to a generator or to provide thermal energy for other applications such as thermochemical hydrocarbon fuel production. Heat storage devices are therefore expected to play an important role in the future.

As of late, in particular single-tank heat storage devices such as for example heat storage devices using a packed bed of low-cost filler material in combination with a heat transfer fluid have attracted significant interest because they cost less than two-tank systems. While such devices are attractive from the cost perspective, they suffer from several drawbacks such as temperature degradation. Temperature degradation, also known as thermocline degradation, refers to the flattening of temperature gradients in the heat storage devices during operation, i.e. as a consequence of successive charging-discharging cycles. Thermocline degradation has several negative consequences. One is an increase of the heat transfer fluid (HTF) outflow temperature during charging relative to the inflow temperature during discharging and a decrease of the heat transfer fluid outflow temperature during discharging relative to the inflow temperature during charging. It is however desirable to provide constant outflow temperature in order to more efficiently operate the equipment utilizing the thermal energy such as for example a heat engine. In the same vein, it is further desirable to establish a steady state as fast as possible for the sake of efficient operation of the power generating equipment. Another negative consequence of thermocline degradation is a limited utilization factor. The larger the width of the thermocline region the smaller the utilization factor, and the larger the specific material cost of the storage, i.e., the material cost per utilized capacity. Thermocline degradation thus makes heat storage devices both less efficient and more expensive.

There is therefore a need to both increase utilization factor and decrease the thermocline region width in heat device storage devices while at the same time quickly providing a constant outflow temperature in order to run the equipment utilizing the thermal energy at maximum efficiency as early as possible.

U.S. Pat. No. 8,554,377 B2 discloses a method for optimizing a thermocline region in a thermal energy storage fluid within a thermal storage tank. The method relies on the extraction of heat transfer fluid from the tank at the location of the thermocline region, adding thermal energy to the heat transfer fluid extracted from the thermocline region using a heat exchanger and then returning the heat transfer fluid to the tank at the location above the thermocline region. By doing so, the width of the thermocline region is reduced and the utilization factor is increased.

SUMMARY OF THE INVENTION

The present invention provides a novel method of operating a thermal energy storage device by which the thermocline region can be controlled and the storage utilization factor can be further increased. The method further allows enhancing the efficiency of a heat engine that converts the heat from the thermal energy storage to mechanical, electrical or chemical energy by providing an outflow constantly having a set temperature.

It is an object of the present invention to provide a method of operating a thermal energy storage device comprising a body of heat transfer fluid, said body of heat transfer fluid comprising an upper temperature region comprising heat transfer fluid having a temperature above a upper threshold temperature, a lower temperature region comprising heat transfer fluid having a temperature below a lower threshold temperature and a thermocline region separating the upper and lower temperature regions and comprising heat transfer fluid having a temperature above a lower threshold temperature and below an upper threshold temperature, wherein during charging of the thermal energy storage device, heat transfer fluid is removed from the thermocline region of the body of heat transfer fluid and when the temperature of the heat transfer fluid being removed from the thermocline region of the body of heat transfer fluid rises above a maximum temperature, said heat transfer fluid being removed is brought to a temperature equal to or below said maximum temperature, wherein the maximum temperature is above the lower threshold temperature and/or wherein during discharging of the thermal energy storage device, heat transfer fluid is removed from the thermocline region of the body of heat transfer fluid and when the temperature of the heat transfer fluid being removed from the thermocline region of the body of heat transfer fluid falls below a minimum temperature, said heat transfer fluid being removed is brought to a temperature equal to or above said minimum temperature, wherein said minimum temperature is below the upper threshold temperature.

In a preferred embodiment, the method of operating a thermal energy storage device comprising a body of heat transfer fluid, said body of heat transfer fluid comprising an upper temperature region comprising heat transfer fluid having a temperature above a upper threshold temperature, a lower temperature region comprising heat transfer fluid having a temperature below a lower threshold temperature and a thermocline region separating the upper and lower temperature regions and comprising heat transfer fluid having a temperature above a lower threshold temperature and below an upper threshold temperature, wherein during charging of the thermal energy storage device, heat transfer fluid is removed from the thermocline region of the body of heat transfer fluid and when the temperature of the heat transfer fluid being removed from the thermocline region of the body of heat transfer fluid rises above a maximum temperature, said heat transfer fluid being removed is brought to a temperature equal to or below said maximum temperature by combining the heat transfer fluid being removed and having a temperature above a maximum temperature with heat transfer fluid having a temperature below the lower threshold temperature, which heat transfer fluid having a temperature below the lower threshold temperature is sourced from the lower temperature region of the body of heat transfer fluid, wherein the maximum temperature is above the lower threshold temperature and/or wherein during discharging of the thermal energy storage device, heat transfer fluid is removed from the thermocline region of the body of heat transfer fluid and when the temperature of the heat transfer fluid being removed from the thermocline region of the body of heat transfer fluid falls below a minimum temperature, said heat transfer fluid being removed is brought to a temperature equal to or above said minimum temperature by combining the heat transfer fluid being removed and preferably having a temperature below a minimum temperature with heat transfer fluid having a temperature above the upper threshold temperature, which heat transfer fluid is sourced from the upper temperature region of the body of heat transfer fluid, wherein said minimum temperature is below the upper threshold temperature.

It has been found that when the above method is carried out in the context of a thermal storage device, it is possible to more precisely control the thermal stress experienced by the systems thermally associated with the thermal storage device such as for example heat engines or thermochemical systems while also reducing the width of the thermocline in the body of heat transfer fluid to ensure a higher utilization factor of the tank of a thermal storage device.

In an embodiment of the method of operating a thermal energy storage device according to an object of the present invention, during charging of the thermal energy storage device, the heat transfer fluid being removed from the thermocline region of the body of heat transfer fluid and having a temperature above a maximum temperature is brought to a temperature equal to or below said maximum temperature by combining the heat transfer fluid being removed and having a temperature above a maximum temperature with heat transfer fluid having a temperature below the maximum temperature, and/or during discharging of the thermal energy storage device, the heat transfer fluid being removed from the thermocline region of the body of heat transfer fluid and having a temperature below a minimum temperature is brought to a temperature equal to or above said minimum temperature by combining the heat transfer fluid being removed with heat transfer fluid having a temperature above the minimum temperature, i.e. the heat transfer fluid being removed from the thermocline region of the body of heat transfer fluid and having a temperature below a minimum temperature is brought to a temperature equal to or above said minimum temperature by combining the heat transfer fluid being removed with heat transfer fluid having a temperature above the minimum temperature such that both heat transfer fluids having different temperatures are mixed together and the resulting combined heat transfer fluid is in thermal equilibrium. Combining the heat transfer fluids can be achieved by for example combining the heat transfer fluids at an intersection between conduits transporting the respective heat transfer fluid, i.e. at a Y-junction. The resulting vortex at the intersection is in most cases sufficient to mix the heat transfer fluids being combined, but it is understood that mixing means can be additionally be provided at the intersection or downstream of the intersection such as for example static mixing elements.

It has been found that when the above method is carried out in the context of a thermal storage device, it is possible to more precisely control the thermal stress experienced by the systems thermally connected with the thermal storage device such as for example heat engines or thermochemical systems while and also reducing the width of the thermocline in the body of heat transfer fluid to provide a stream of heat transfer fluid that has a predetermined temperature, i.e. a temperature equal to or below the maximal temperature to ensure a higher utilization factor of the tank of a thermal storage device.

In an embodiment of the method of operating a thermal energy storage device according to an object of the present invention, during charging of the thermal energy storage device, the heat transfer fluid being removed from the thermocline region of the body of heat transfer fluid and having a temperature above a maximum temperature is brought to a temperature equal to or below said maximum temperature by combining the heat transfer fluid being removed and having a temperature above a maximum temperature with heat transfer fluid having a temperature below the maximum temperature, which heat transfer fluid having a temperature below the maximum temperature is sourced from the lower temperature region of the body of heat transfer fluid and/or during discharging of the thermal energy storage device, the heat transfer fluid being removed from the thermocline region of the body of heat transfer fluid and having a temperature below a minimum temperature is brought to a temperature equal to or above said minimum temperature by combining the heat transfer fluid being removed with heat transfer fluid having a temperature above the minimum temperature, which heat transfer fluid is sourced from the upper temperature region of the body of heat transfer fluid.

It has been found that when the above method is carried out in the context of a thermal storage device, it is possible to more precisely control the thermal stress experienced by the thermal storage device containing and circulating the heat transfer fluid as a whole while and also reducing the width of the thermocline in the body of heat transfer fluid to provide a stream of heat transfer fluid that has a predetermined temperature, i.e. a temperature equal to or below the maximal temperature to ensure a higher utilization factor of the tank of a thermal storage device since streams from one and the same body of heat transfer fluid are combined without the need to use external heat transfer fluid.

In an embodiment of the method of operating a thermal energy storage device according to an object of the present invention, during charging of the thermal energy storage device, the heat transfer fluid being removed from the thermocline region of the body of heat transfer fluid and having a temperature above a maximum temperature is brought to a temperature equal to or below said maximum temperature by combining the heat transfer fluid being removed and having a temperature above a maximum temperature with heat transfer fluid having a temperature below the maximum temperature by adjusting the flow rate of either heat transfer fluids being combined, and/or during discharging of the thermal energy storage device, the heat transfer fluid being removed from the thermocline region of the body of heat transfer fluid and having a temperature below a minimum temperature is brought to a temperature equal to or above said minimum temperature by combining the heat transfer fluid being removed with heat transfer fluid having a temperature above the minimum temperature by adjusting the flow rate of either heat transfer fluids being combined.

It has been found that when the above method is carried out in the context of a thermal storage device, it is possible to bring the combined stream of heat transfer fluid being removed from the thermocline and of heat transfer fluid being removed the upper or lower temperature region to a desired temperature solely by adjusting the respective flow rates. It thus allows to simultaneously reduce the width of the thermocline during cycling of the thermal storage device and utilize the heat transfer fluid being removed from the thermocline and to control the temperature of the combined stream in order improve overall efficiency of the thermal storage device and the thermally associated systems such as for example heat engines.

In an embodiment of the method of operating a thermal energy storage device according to an object of the present invention, charging of the thermal energy storage device, the flow rate of the heat transfer fluid being removed from the lower temperature region having a temperature below the lower threshold temperature is inferior to the flow rate of heat transfer fluid being added to the upper temperature region having a temperature above an upper threshold temperature, and/or discharging of the thermal energy storage device, the flow rate of the heat transfer fluid being removed from the upper temperature region having a temperature above the upper threshold temperature is inferior to the flow rate of heat transfer fluid being added to the lower temperature region having a temperature below a lower threshold temperature.

It has been found that when the above method is carried out in the context of a thermal storage device, the width of the thermocline can further be reduced (or the steepness of the thermocline can be increased) because the part of the thermocline below the opening through which the heat transfer fluid is being removed will move slower than the part above the opening through which the heat transfer fluid is being removed.

In an embodiment of the method of operating a thermal energy storage device according to an object of the present invention, during charging of the thermal energy storage device, the heat transfer fluid being removed from the thermocline region of the body of heat transfer fluid and having a temperature above a maximum temperature is brought to a temperature being equal to or below the maximum temperature and held at said temperature equal to or below the maximum temperature, and/or during discharging of the thermal energy storage device, the heat transfer fluid being removed from the thermocline region of the body of heat transfer fluid and having a temperature below an minimum temperature is brought to a temperature equal to or above the minimum temperature and is held at said temperature equal to or above the minimum temperature.

It has been found that when the above method is carried out in the context of a thermal storage device, the mechanical strain resulting from thermal expansion of different materials can be reduced at the level of the thermal storage device and in particular at the level of downstream equipment such as conduits. Furthermore, a constant supply of heat transfer fluid having a set temperature increases the efficiency of the systems which are thermally connected to the thermal storage device.

In an embodiment of the method of operating a thermal energy storage device according to an object of the present invention, during charging of the thermal energy storage device, the heat transfer fluid being removed from the thermocline region of the body of heat transfer fluid and having a temperature above a maximum temperature is brought to a first set point temperature being equal to or below the maximum temperature and is then brought to a second set point temperature equal to or below the maximum temperature, under proviso that the first and second set point temperature are different, and/or during discharging of the thermal energy storage device, the heat transfer fluid being removed from the thermocline region of the body of heat transfer fluid and having a temperature below an minimum temperature is brought to a first set point temperature equal to or above the minimum temperature and is then brought to a second set point temperature equal to or above the minimum temperature, under proviso that the first and second set point temperature are different.

It has been found that when the above method is carried out in the context of a thermal storage device, it is possible to further increase the efficiency of a system thermally connected to the thermal heat storage device, since there exist systems which rely on the not a constant temperature but on at certain temperature profile in which for example the temperature is varied between two set point temperatures or even three or more set point temperatures. It is understood that the two set point temperatures may in one embodiment correspond to a temperature maximum value and minimum value, respectively, of an oscillating temperature profile.

In an embodiment of the method of operating a thermal energy storage device according to an object of the present invention, the body of heat transfer fluid comprises or consists essentially of a supercritical or subcritical state. An example of a subcritical heat transfer fluid is molten salts, which are regularly used in thermal storage devices. In the case where the heat transfer fluid is a gas such as inert gas, nitrogen or air, the utilisation factor can be increased sevenfold when carrying out the method according to the present invention when compared to a method in which no control of the thermocline is carried out.

In an embodiment of the method of operating a thermal energy storage device according to an object of the present invention, during charging of the thermal energy storage device, heat transfer fluid is removed from the thermocline region of the body of heat transfer fluid and when the temperature of the heat transfer fluid being removed from the thermocline region of the body of heat transfer fluid rises above a maximum temperature, said heat transfer fluid being removed is brought to a temperature equal to or below said maximum temperature, wherein the maximum temperature is above the lower threshold temperature and wherein the said procedure is subsequently repeated one or more times during charging, and is preferably subsequently repeated one or more times until the heat transfer fluid having a temperature below the lower threshold temperature is essentially depleted and/or during discharging of the thermal energy storage device, heat transfer fluid is removed from the thermocline region of the body of heat transfer fluid and when the temperature of the heat transfer fluid being removed from the thermocline region of the body of heat transfer fluid falls below a minimum temperature, said heat transfer fluid being removed is brought to a temperature equal to or above said minimum temperature, wherein the minimum temperature is below the upper threshold temperature and wherein said procedure is subsequently repeated one or more times during discharging, and is preferably subsequently repeated one or more times until the heat transfer fluid having a temperature above the upper threshold temperature is essentially depleted.

It has been found that when the above method is carried out in the context of a thermal storage device, it is possible to essentially continuously control the width of the thermocline and thereby to even further increase the utilization factor. While the number of openings needed in the thermal energy storage device must also be increased to subsequently repeat the thermocline width control procedure during charging and discharging as the thermocline moves down and up through the tank of the thermal energy storage device, it has been found that when the procedure is carried out two, three or four times, i.e. subsequently repeated one, two or three times, the increase in utilization factor easily justifies the added cost of more openings.

In an embodiment of the method of operating a thermal energy storage device according to an object of the present invention, the thermal energy storage device is thermally connected, such as to allow an exchange of thermal energy, to a system capable of at least partially using and/or converting thermal energy comprised in heat transfer fluid having a temperature equal or below the maximum outflow temperature during charging and/or having a temperature equal to or above the minimum outflow temperature during discharging into another form of energy, preferably a system capable of converting the thermal energy into mechanical energy or chemical energy, or to a state of higher or lower thermal energy. In one embodiment, the thermal energy storage may be thermally connected to a system for thermal energy recovery such as for example in a steel mill or paper mill. In a steel mill, much energy can be recovered by storing the thermal energy released by a blast furnace or by incandescent metal, thereby bringing down energy consumption and cost. In one embodiment, the thermal energy storage device may be thermally connected to a solar thermal collector or solar receiver. During charging, the flow resulting from the combination of heat transfer fluid being removed from both the thermocline region and lower temperature region of the body of heat transfer fluid is directed to a solar thermal collector or solar receiver to be brought to a temperature above the upper threshold temperature and to be returned to the upper temperature region of the body of heat transfer fluid in the thermal energy storage device.

It is another object of the present invention to provide a thermal energy storage device comprising a tank for holding a body of heat transfer fluid, said body of heat transfer fluid comprising an upper temperature region comprising heat transfer fluid having a temperature above an upper threshold temperature, a lower temperature region comprising heat transfer fluid having a temperature below a lower threshold temperature and a thermocline region separating the upper and lower temperature regions and comprising heat transfer fluid having a temperature above a lower threshold temperature and below an upper threshold temperature, the tank comprising at least one upper opening for adding a heat transfer fluid having a temperature above an upper threshold temperature to the region of the tank corresponding to the upper temperature region of the body of heat transfer fluid during charging and for removing a heat transfer fluid having a temperature above an upper threshold temperature from the region of the tank corresponding to the upper temperature region of the body of heat transfer fluid during discharging, the tank comprising at least one lower opening for removing a heat transfer fluid having a temperature below a lower threshold temperature from the region of the tank corresponding to the lower temperature region of the body of heat transfer fluid during charging and adding a heat transfer fluid having a temperature above a lower threshold temperature to the region of the tank corresponding to the lower temperature region of the body of heat transfer fluid during discharging, the tank comprising at least one intermediate opening for removing a heat transfer fluid from the region of the tank corresponding to the thermocline region of the body of heat transfer fluid during charging or discharging, said at least one intermediate opening being arranged between the upper opening and the lower opening, and wherein the thermal energy storage device further comprises a plurality of valves capable of adjusting the flow rate across each of the at least one upper opening, the at least one lower opening and the at least one intermediate opening during charging and discharging, and characterized in that the at least one lower opening and the at least one intermediate opening are fluidly connected to each other by conduits such as to allow for the combination of heat transfer fluid being removed from both the thermocline region and lower temperature region of the body of heat transfer fluid at an intersection of said conduits during charging, the intersection being located in particular upstream of a heat exchange device or between the at least one upper opening, the at least one intermediate opening and a heat exchanging device.

It is another object of the present invention to provide a thermal energy storage device comprising a plurality of n tanks, i.e. 2 or more tanks, for holding a body of heat transfer fluid, said body of heat transfer fluid comprising an upper temperature region comprising heat transfer fluid having a temperature above a upper threshold temperature, a lower temperature region comprising heat transfer fluid having a temperature below a lower threshold temperature and a thermocline region separating the upper and lower temperature regions and comprising heat transfer fluid having a temperature above a lower threshold temperature and below an upper threshold temperature, the first tank comprising at least one upper opening for adding a heat transfer fluid having a temperature above an upper threshold temperature to the upper temperature region of the body of heat transfer fluid during charging and for removing a heat transfer fluid having a temperature above an upper threshold temperature from the upper temperature region of the body of heat transfer fluid during discharging, the last tank comprising at least one lower opening for removing a heat transfer fluid having a temperature below a lower threshold temperature from the lower temperature region of the body of heat transfer fluid during charging and adding a heat transfer fluid having a temperature above a lower threshold temperature to the lower temperature region of the body of heat transfer fluid during discharging, wherein the adjoining tanks are fluidly connected to each other via a plurality of n−1 conduits, each of the n−1 conduits fluidly connecting two adjoining tanks, each conduit of the plurality of n−1 conduits comprises at least one intermediate opening for removing a heat transfer fluid from the thermocline region of the body of heat transfer fluid during charging or discharging, and wherein the thermal energy storage device further comprises a plurality of valves capable of adjusting the flow rate across the at least one upper opening of the first tank, the at least one lower opening of the last tank and each of the intermediate openings during charging and discharging, and characterized in that the at least one lower opening of the last tank and each of the intermediate openings are fluidly connected to each other by conduits such as to allow for the combination of heat transfer fluid being removed from both the thermocline region and lower temperature region of the body of heat transfer fluid at an intersection of said conduits during charging, the intersection being located in particular either upstream of a heat exchange device or between the at least one upper opening, the at least one intermediate opening and a heat exchanging device, characterized in that the at least one upper opening of the first tank and each of the intermediate opening are fluidly connected to each other by conduits such as to allow for the combination of the heat transfer fluid being removed from both the thermocline region and upper temperature region of the body of heat transfer fluid at an intersection of said conduits during discharging, the intersection being located in particular either upstream of a heat exchange device or between the at least one upper opening, the at least one intermediate opening and a heat exchanging device.

The thermal energy storage device according to an object of the present invention can thus be used to achieve an outflow of heat transfer fluid during charging and discharging, which outflow will have a constant temperature due to the flow rate being controlled at each of the openings. In particular, in the case where the thermal energy storage device comprises a plurality of n tanks, n being the number of tanks and comprising n−1 intermediate valve-controlled openings fluidly connected to the conduits between adjacent tanks, it is believed that the heat transfer fluid can be removed without inducing a significant amount of turbulence in the body of heat transfer fluid since the removal of heat transfer fluid from a conduit, which is significantly restricted in diameter with respect to the tank results and through which the heat transfer fluid is funneled results in less turbulence. Furthermore, the use of intermediate openings at the conduits is more easily implemented than intermediate openings at the tank in terms of design of the tank.

In an embodiment of the thermal energy storage device according to an object of the present invention, the thermal energy storage device further comprises a control unit capable of controlling the plurality of valves capable of adjusting the flow rate across each of the at least one upper opening, the at least one lower opening and the at least one intermediate opening and configured to control said valves such as to carry out the method of operating a thermal energy storage device according to any one of the methods of operating a thermal energy storage device described hereinabove.

The thermal energy storage device according to the above embodiment can thus be used to implement any one of the methods of operating a thermal energy storage device described hereinabove, by using a control unit configured to accordingly control the flow rate towards the respective intersections. It is understood that in order to achieve temperature control of the heat transfer fluid exiting the intersection by controlling the flow rate across the openings, the temperature downstream of the intersection or at the respective openings or both is determined and received by the control unit so that the flow rate can be controlled depending on the temperature determined by the sensors.

In an embodiment of the thermal energy storage device according to an object of the present invention, the thermal energy storage device further comprises a conduit capable of bypassing the thermal energy storage device during charging and/or discharging.

The thermal energy storage device according to the above embodiment can thus be used even after the thermal energy storage device is either filled with heat transfer fluid having a temperature above the upper threshold temperature or filled with heat transfer fluid having a temperature below the lower threshold temperature, by bypassing the thermal energy storage device and redirecting further heat transfer fluid having a temperature above the upper threshold temperature or heat transfer fluid having a temperature below the lower threshold temperature directly towards a system thermally connected to the thermal energy storage device.

In an embodiment of the thermal energy storage device according to an object of the present invention, the tank comprises at least two or more than two, three or more than three, or four or more than four intermediate openings for removing a heat transfer fluid from the region of the tank corresponding to the thermocline region of the body of heat transfer fluid during charging and/or discharging, which intermediate openings are preferably evenly spaced with respect to each other along the direction of flow of heat transfer fluid during charging or along a vertical direction.

The thermal energy storage device according to the above embodiment can thus be used more efficiently since more intermediate openings for removing a heat transfer fluid from the region of the tank corresponding to the thermocline region mean that the thermocline region of the body of heat transfer fluid can be reduced in width at multiple heights of the tank as it moves across the tank during charging/discharging, which fluid can then be combined with heat transfer fluid from the region of the tank corresponding to the lower region during charging and with heat transfer fluid from the region of the tank corresponding to the upper region during discharging.

In an embodiment of the thermal energy storage device according to an object of the present invention, the tank comprises a packed bed of solids such as for example gravel or inorganic material spheres. Alternatively, an a packed bed of encapsulated phase change material can also be used.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
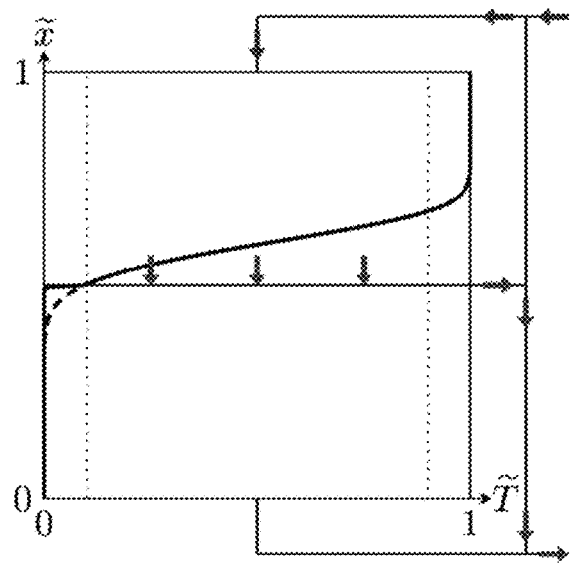
FIG. 1 shows a schematic depiction of the operation of a thermal storage device in which the thermocline is controlled by way of sole extraction of the thermocline using one opening located at mid-height between the upper and lower opening. The solid black line represents the thermocline resulting from the control by extraction of thermocline whereas the dotted line corresponds to the thermocline resulting from no control at the same instant. (a) shows the charging of the thermal storage device immediately prior to switching on the extraction of the thermocline through the intermediate opening, (b) shows the charging of the thermal storage device immediately after switching on removal of heat transfer fluid via the lower opening. (c) shows the discharging of the thermal storage device immediately prior to switching on the extraction of the thermocline through the intermediate opening, (d) shows the discharging of the thermal storage device immediately after switching on the removal of the heat transfer fluid through the upper opening.
Figure 1:
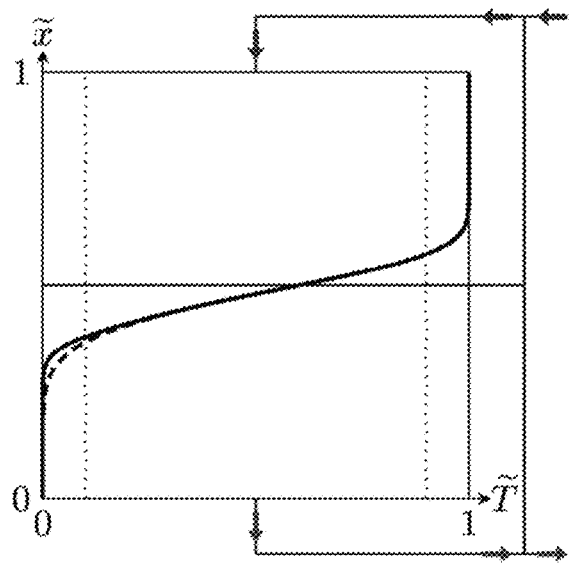
Figure 1:
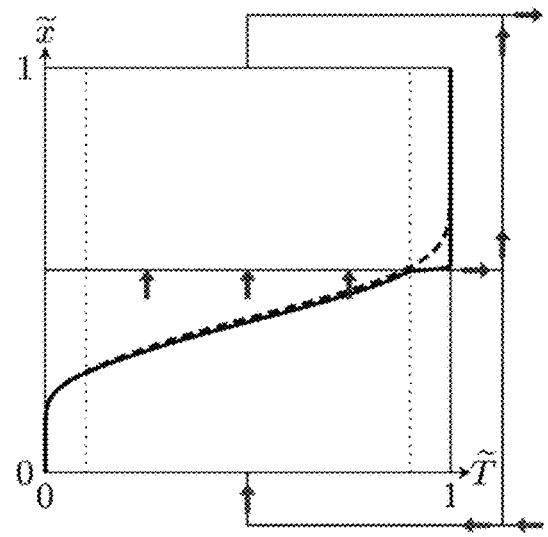
Figure 1:
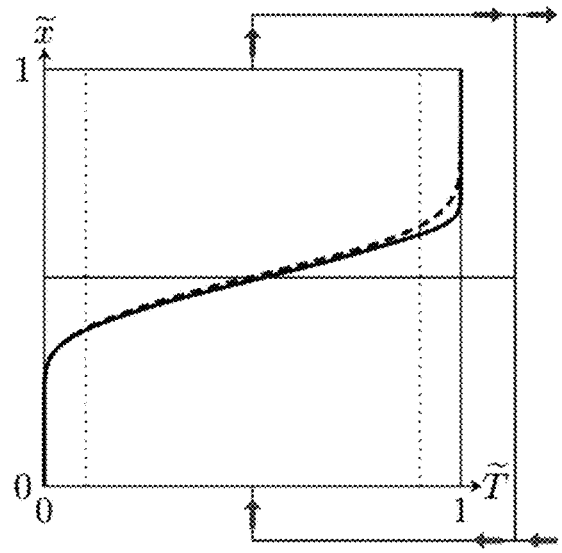
Figure 2:
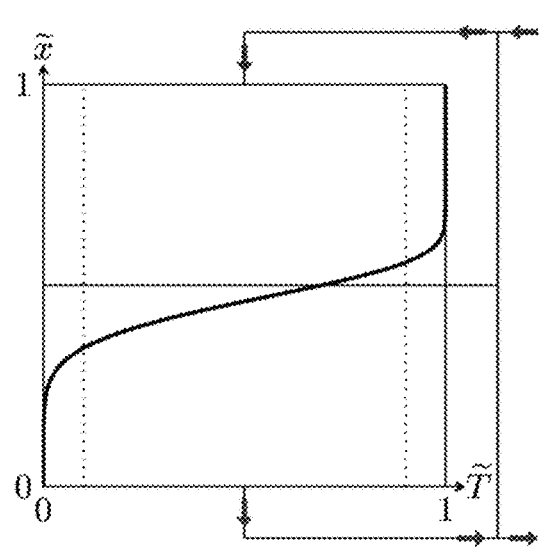
FIG. 2 shows a schematic depiction of the operation of a thermal storage device in which the thermocline is controlled by way of sole injection of heat transfer fluid from the upper temperature region into the thermocline using one opening located at mid-height between the upper and lower opening. The solid black line represents the thermocline resulting from the control by injection of thermocline whereas the dotted line corresponds to the thermocline resulting from no control at the same instant. (a) shows the charging of the thermal storage device immediately prior to switching on the injection into the thermocline through the intermediate opening, (b) shows the charging of the thermal storage device immediately after switching on the injection of the thermocline through the intermediate opening. (c) shows the discharging of the thermal storage device immediately prior to switching on the injection into the thermocline through the intermediate opening, (d) shows the discharging of the thermal storage device immediately after switching on the injection into the thermocline through the intermediate opening.
Figure 2:
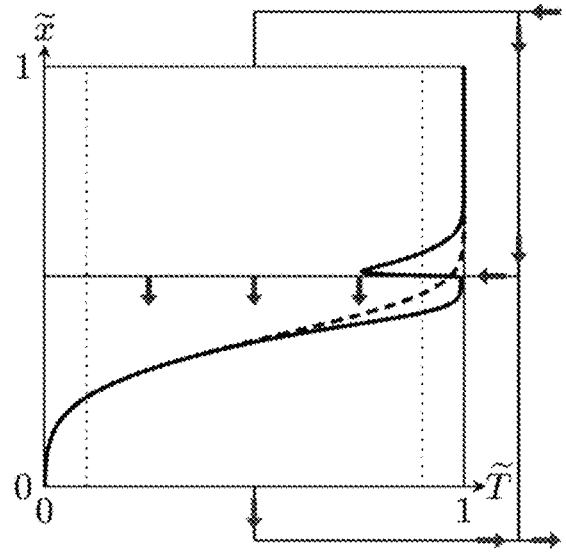
Figure 2:
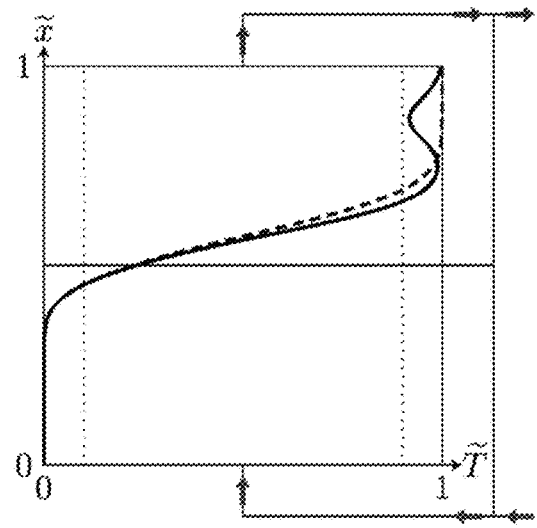
Figure 2:
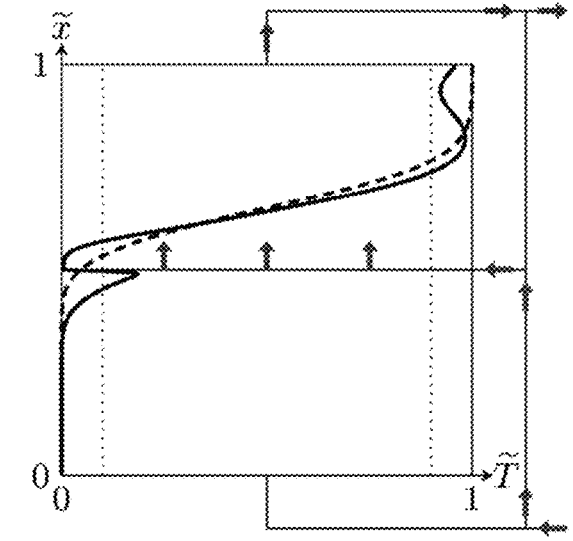
Figure 3:
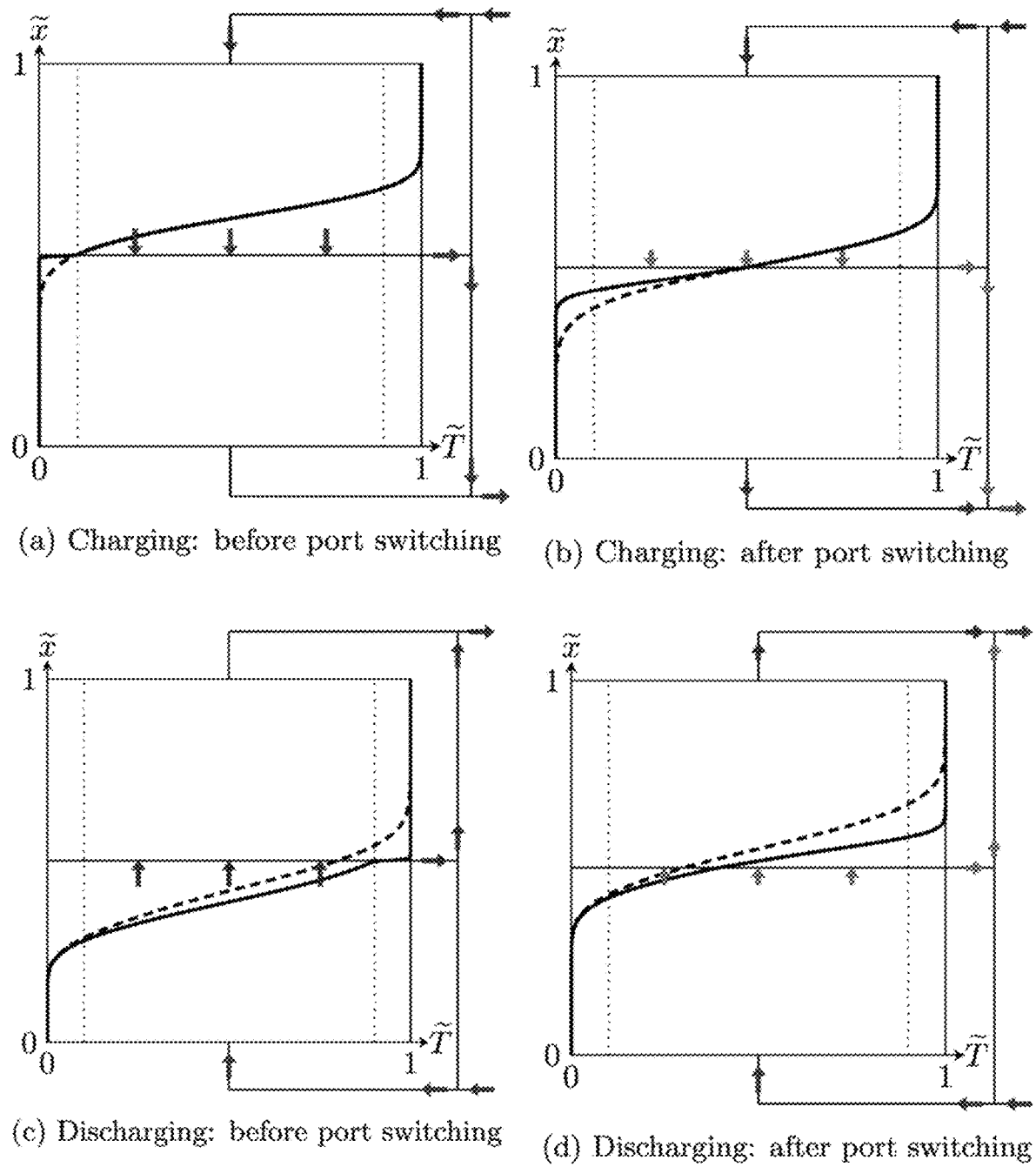
FIG. 3 shows a schematic depiction of the operation of a thermal storage device in which the thermocline is controlled by way of mixing heat transfer fluid from the lower temperature region with heat transfer fluid from the thermocline region by removing heat transfer fluid from the thermocline region using one opening located at mid-height between the upper and lower opening and combining it with heat transfer fluid being removed from the lower temperature region. The solid black line represents the thermocline resulting from the control by mixing whereas the dotted line corresponds to the thermocline resulting from no control at the same instant. (a) shows the charging of the thermal storage device immediately prior to switching on the removal of heat transfer fluid from the thermocline through the intermediate opening, (b) shows the charging of the thermal storage device immediately after switching on the removal of heat transfer fluid from the thermocline through the intermediate opening and combining it with heat transfer fluid being removed from the lower temperature region at an intersection, (c) shows the discharging of the thermal storage device immediately prior to switching on the removal of heat transfer fluid from the thermocline through the intermediate opening, (d) shows the discharging of the thermal storage device immediately after switching on the removal of heat transfer fluid from the thermocline through the intermediate opening and combining it with heat transfer fluid being removed from the upper temperature region.
Figure 4:
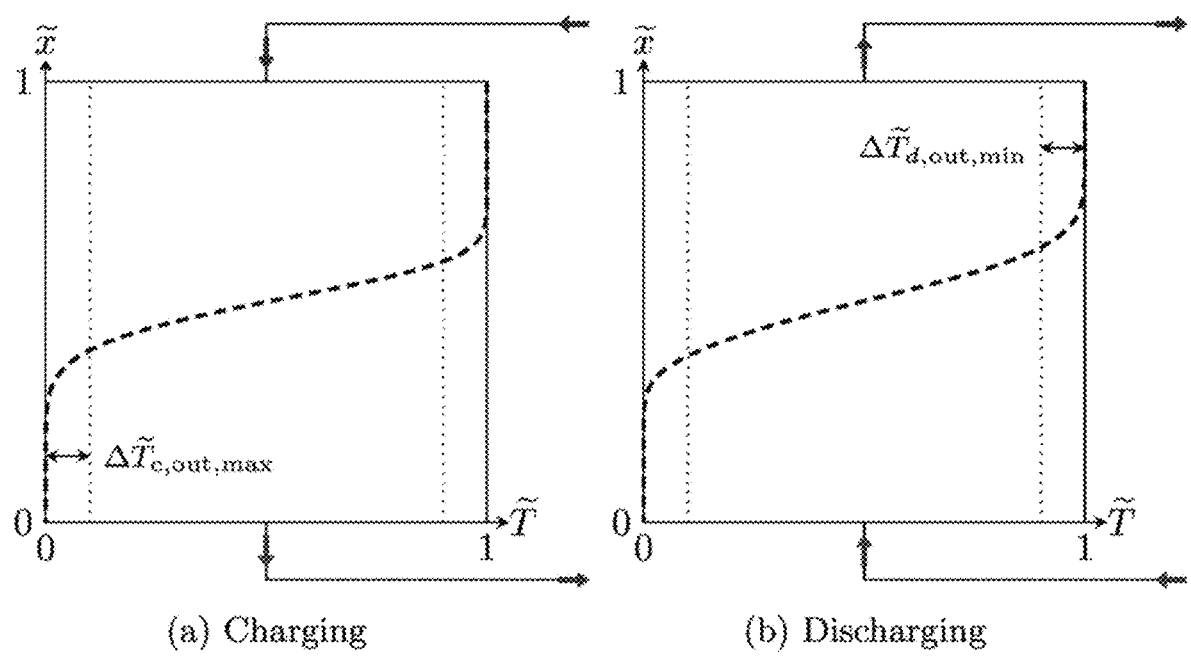
FIG. 4 shows a schematic depiction of the operation of a thermal storage device in which the thermocline is not controlled. The dotted line corresponds to the thermocline during charging (a) and discharging (b).
Figure 5:
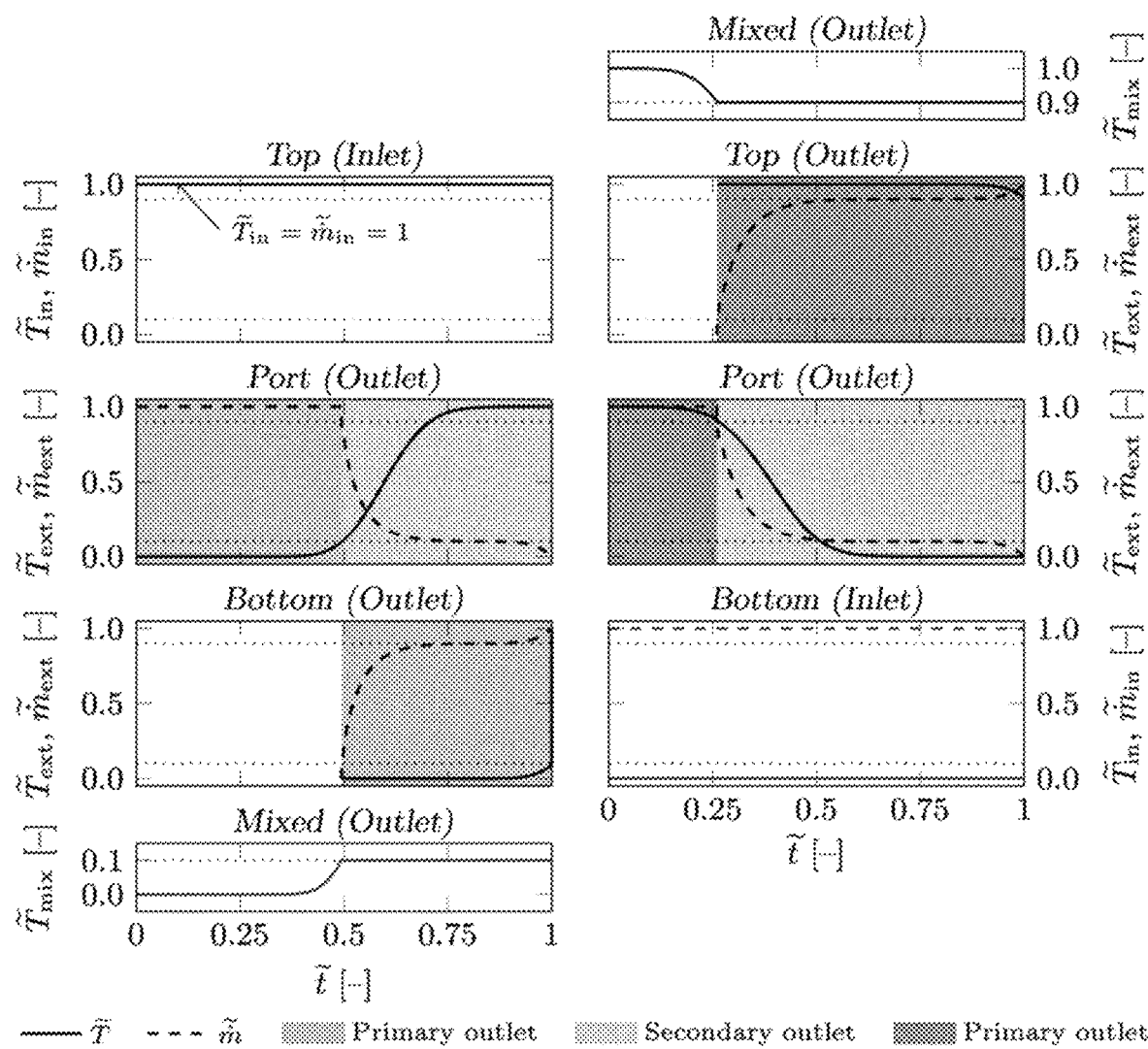
FIG. 5 shows the temporal evolution of flow rates (dashed line) and temperature (solid black line) at the upper, intermediate and lower openings of a thermal storage device in which the thermocline is controlled by way of mixing heat transfer fluids, operating during charging (left) in the case where the thermal storage device has one intermediate opening located at mid-height between the upper and lower opening. As the descending thermocline passes the intermediate opening, the temperature of the heat transfer fluid being removed through the intermediate opening rises and the flow rate is reduced. At the same time the flow rate of heat transfer fluid being removed through the lower opening is increased to provide a combined outflow having a constant temperature and operating during discharging (right) in the case where the thermal storage device has one intermediate opening located at mid-height between the upper and lower opening. As the ascending thermocline passes the intermediate opening, the temperature of the heat transfer fluid being removed through the intermediate opening sinks and the flow rate is reduced. At the same time the flow rate of heat transfer fluid being removed through the upper opening is increased to provide a combined outflow having a constant temperature.
Figure 6:
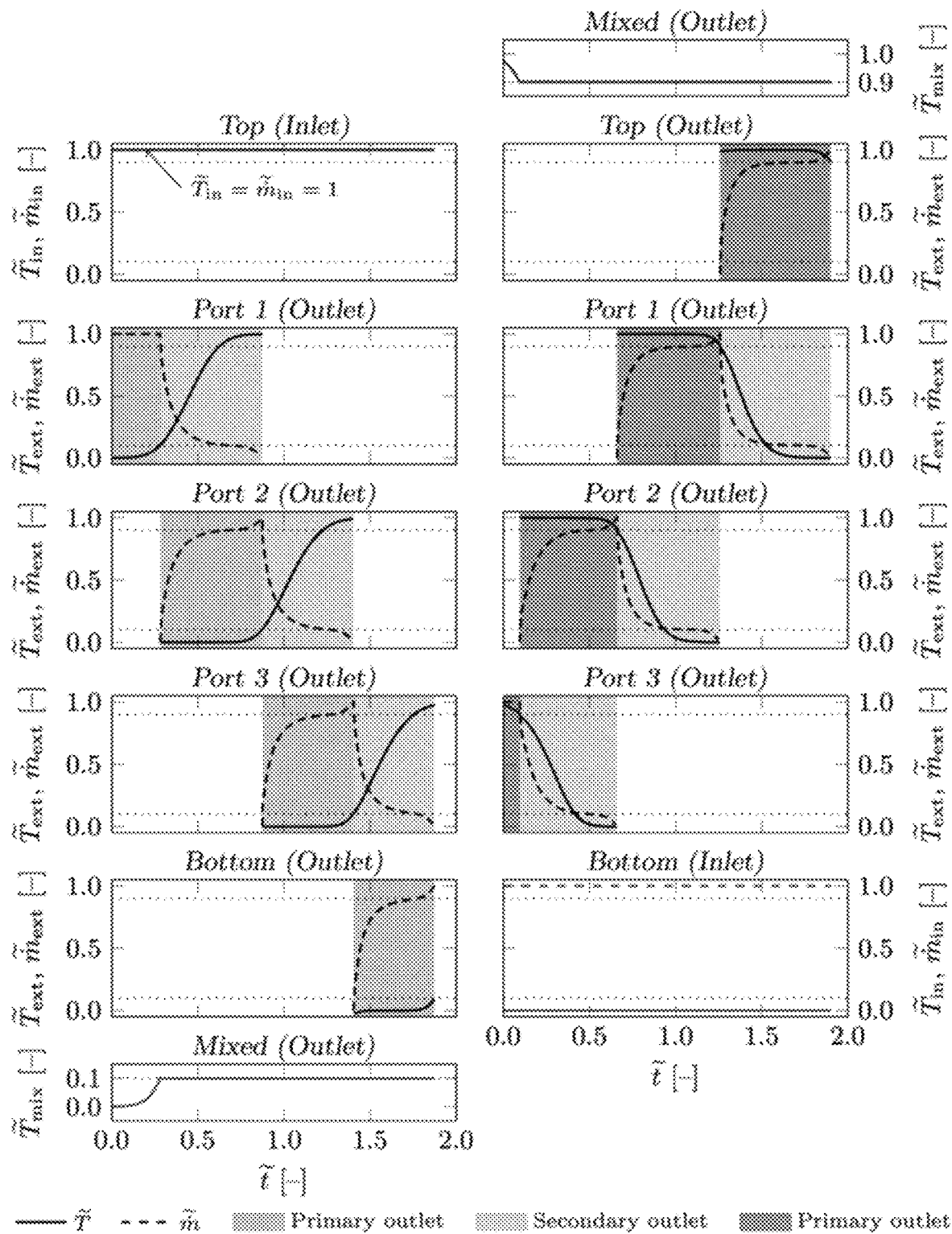
FIG. 6 shows the temporal evolution of flow rates (dashed line) and temperature (solid black line) at the upper, intermediate and lower openings of a thermal storage device in which the thermocline is controlled by way of mixing heat transfer fluids, operating during charging (left) and discharging (right) in the case where the thermal storage device has three intermediate openings located at between the upper and lower opening.
Figure 7:
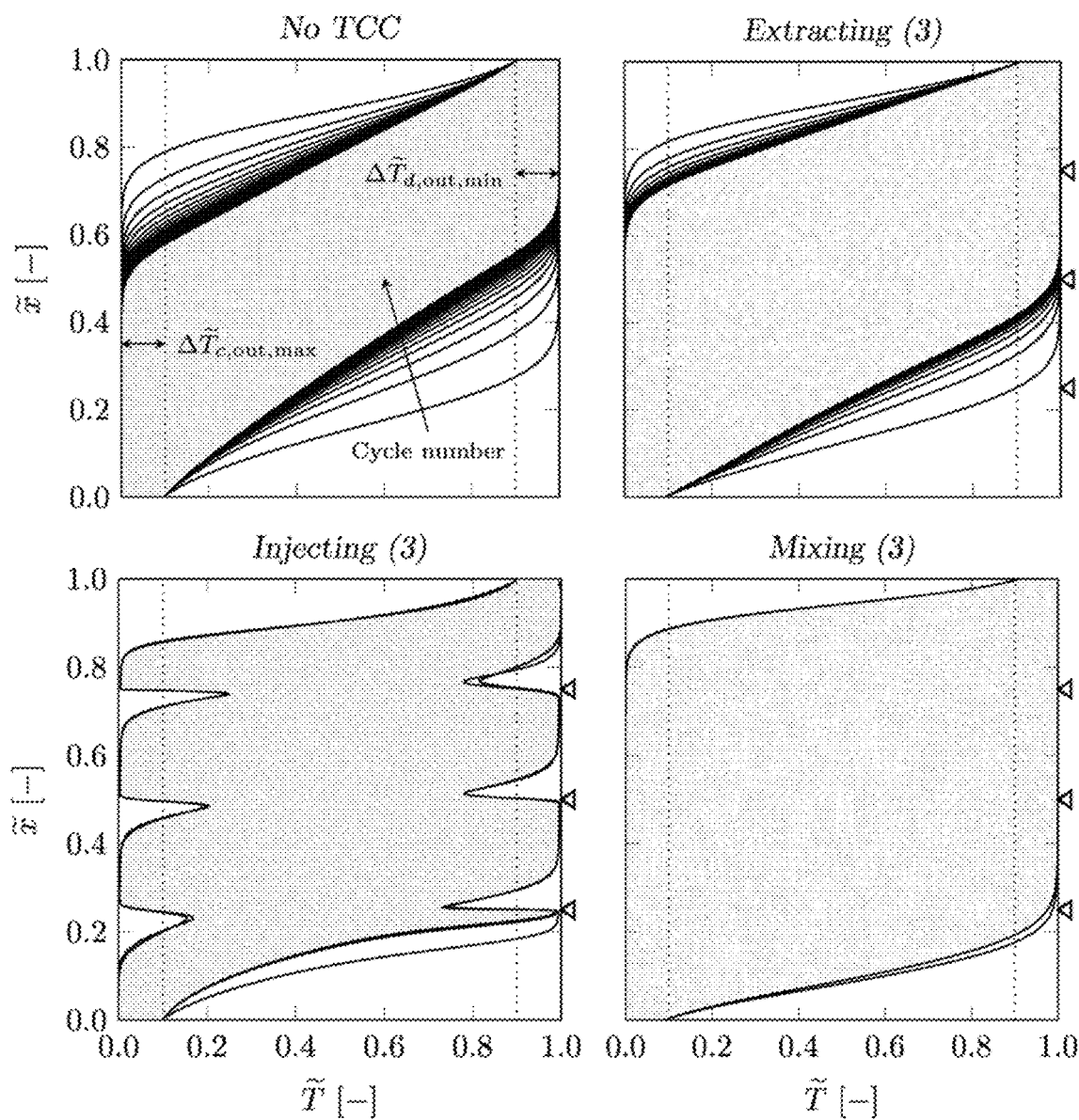
FIG. 7 shows the evolution of the thermocline at the end of successive charging and discharging cycles where the thermocline is controlled by way of extracting, injecting and mixing heat transfer fluids using three intermediate openings spaced along the vertical direction as well as the evolution of the thermocline at the end of successive charging and discharging cycles where the thermocline is not controlled (No TCC) as a comparative. As can be seen, not only is a steady state reached quickly where the thermocline control is controlled by way of mixing heat transfer fluids but also the thermocline is kept steeper than in thermocline control by extracting or injecting. Consequently, the utilization factor is maximized where the thermocline control is controlled by way of mixing heat transfer fluids.
Figure 8:
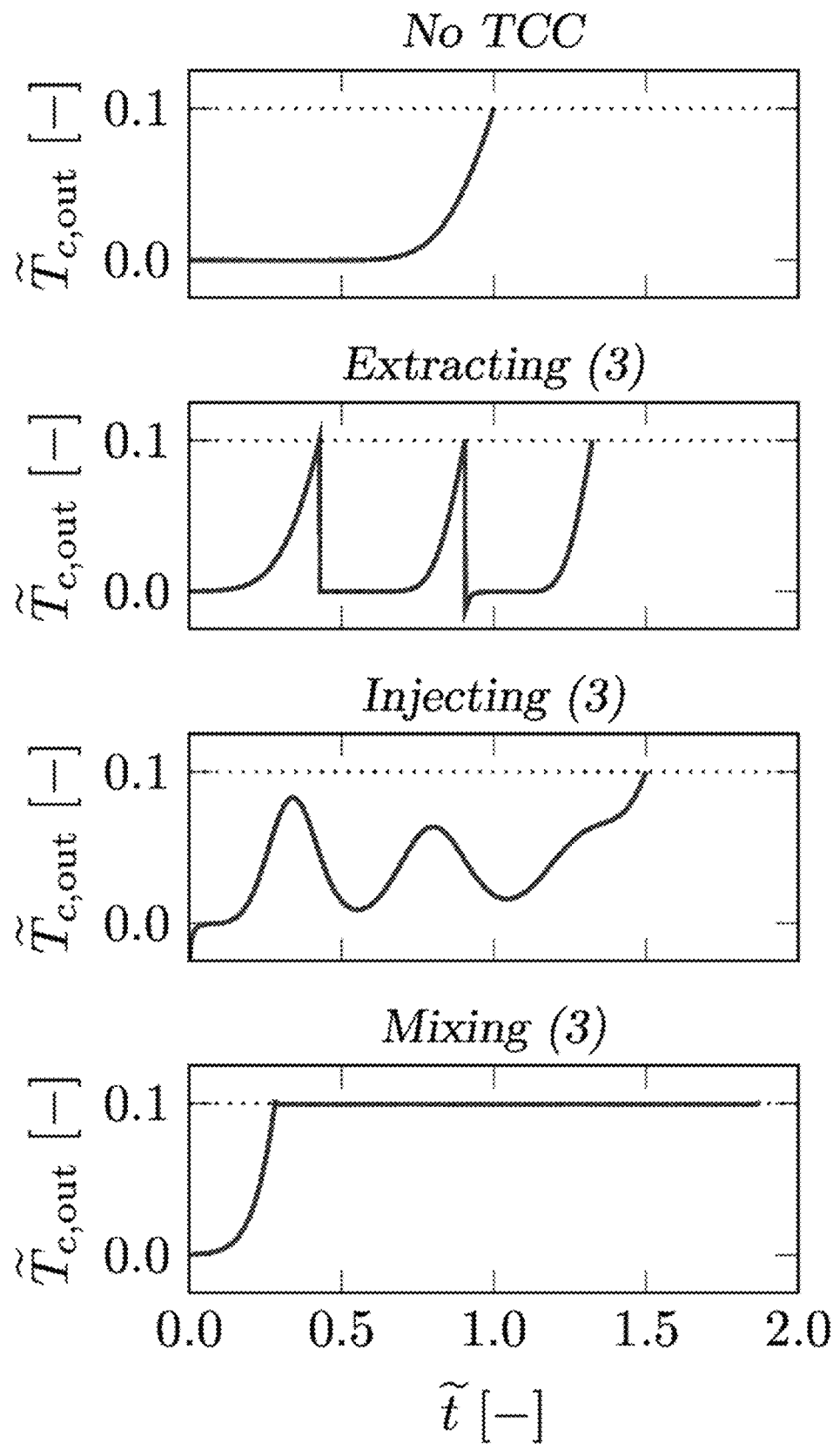
FIG. 8 shows the temporal evolution of outflow temperature during charging at the quasi steady-state for each of the thermocline control variants (solid line) in the case where the thermal storage device has three intermediate openings located between the upper and lower opening. As can be seen, where the thermocline control is controlled by way of mixing heat transfer fluids the variation in temperature is supressed and a set temperature can be held.
Figure 9:
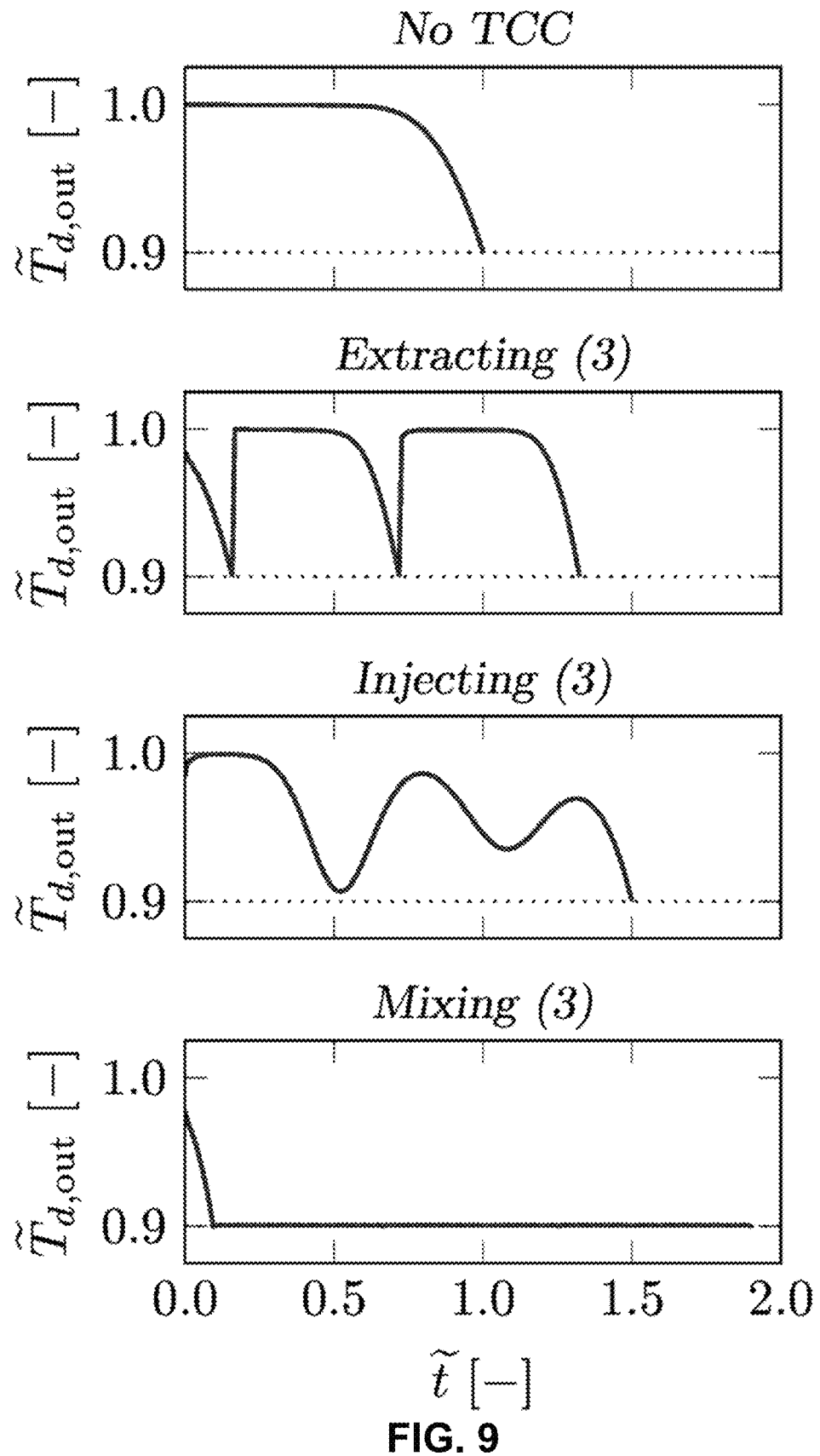
FIG. 9 shows the temporal evolution of outflow temperature during discharging at the quasi steady-state for each of the thermocline control variants (solid line) in the case where the thermal storage device has three intermediate openings located between the upper and lower opening. As can be seen, where the thermocline is controlled by way of mixing heat transfer fluids the variation in temperature is supressed and a set temperature can be held.
Figure 10:
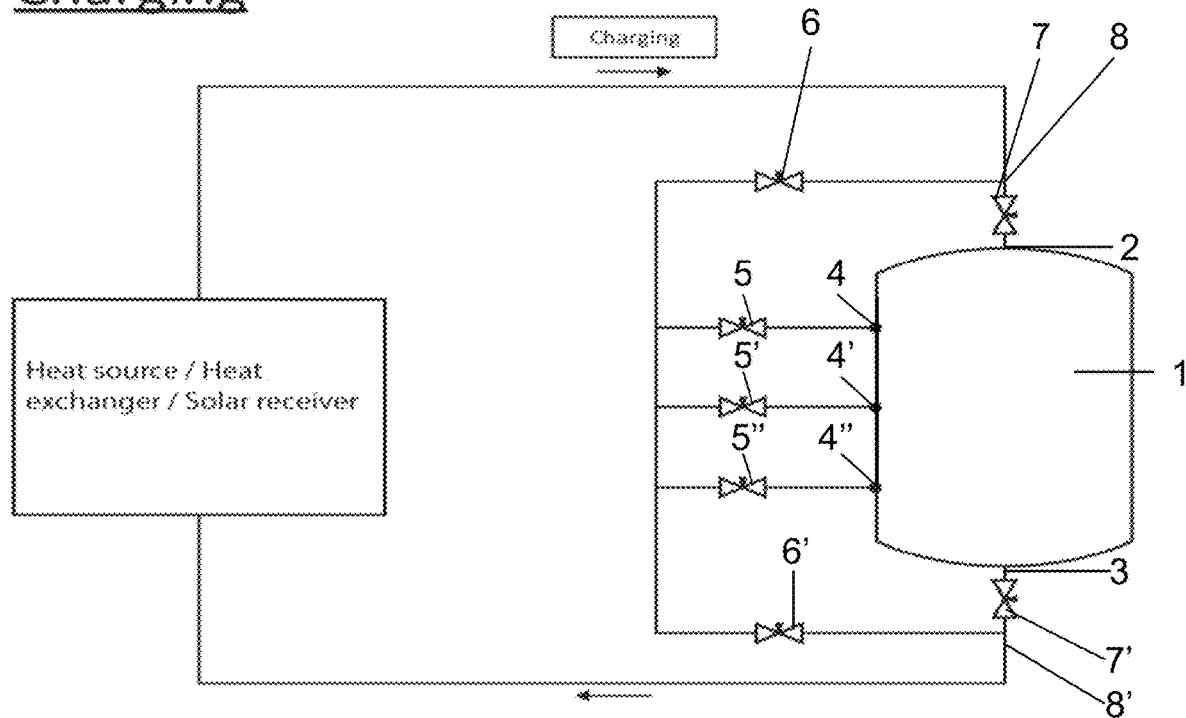
FIG. 10 shows a thermal energy storage device during charging and discharging according to an embodiment of the present invention, comprising one tank (1) for holding a body of heat transfer fluid, having one upper opening (2) for adding a heat transfer fluid to the body of heat transfer fluid during charging and for removing a heat transfer fluid from the body of heat transfer fluid during discharging, having one lower opening (3) for removing a heat transfer fluid from the lower temperature region of the body of heat transfer fluid during charging and adding a heat transfer fluid to the body of heat transfer fluid during discharging, having three intermediate openings (4, 4', 4") for removing a heat transfer fluid from the body of heat transfer fluid during charging or discharging and being arranged between the upper opening (2) and the lower opening (3), and three valves (5, 5', 5") capable of adjusting the flow rate through the three intermediate openings during charging and discharging, as well as two valves (6, 6') that allow to selectively fluidly connect the intermediate openings with the upper or lower opening via the conduits or to bypass the tank, and two valves (7, 7') capable of adjusting the flow through the upper and lower openings (2, 3). During charging, valve (7) is open, valve (6) is closed and valve (6') is open, and valves (5, 5', 5") are individually and successively opened as the thermocline region moves downwards to remove heat transfer fluid from the thermocline region and combine it with heat transfer fluid being removed from the lower temperature region via lower opening (3). By controlling the flow across valves (5, 5', 5" and 7'), the temperature of the heat transfer fluid downstream of intersection (8') resulting from the combination of the heat transfer fluid from the thermocline region and the lower temperature region of the the body of heat transfer fluid can be controlled. During discharging, valve (7') is open, valve (6') is closed and valve (6) is open, and valves (5, 5', 5"') are individually and successively opened as the thermocline region moves upwards and past intermediate openings (4, 4', 4") to remove heat transfer fluid from the thermocline region and combine it with heat transfer fluid being removed from the upper temperature region via upper opening (2). By controlling the flow across valves (5, 5', 5" and 7), the temperature of the heat transfer fluid downstream of intersection (8) resulting from the combination of the heat transfer fluid from the thermocline region and the upper temperature region of the body of heat transfer fluid can be controlled. In each case, arrows indicate the direction of flow of heat transfer fluid.
Figure 10:
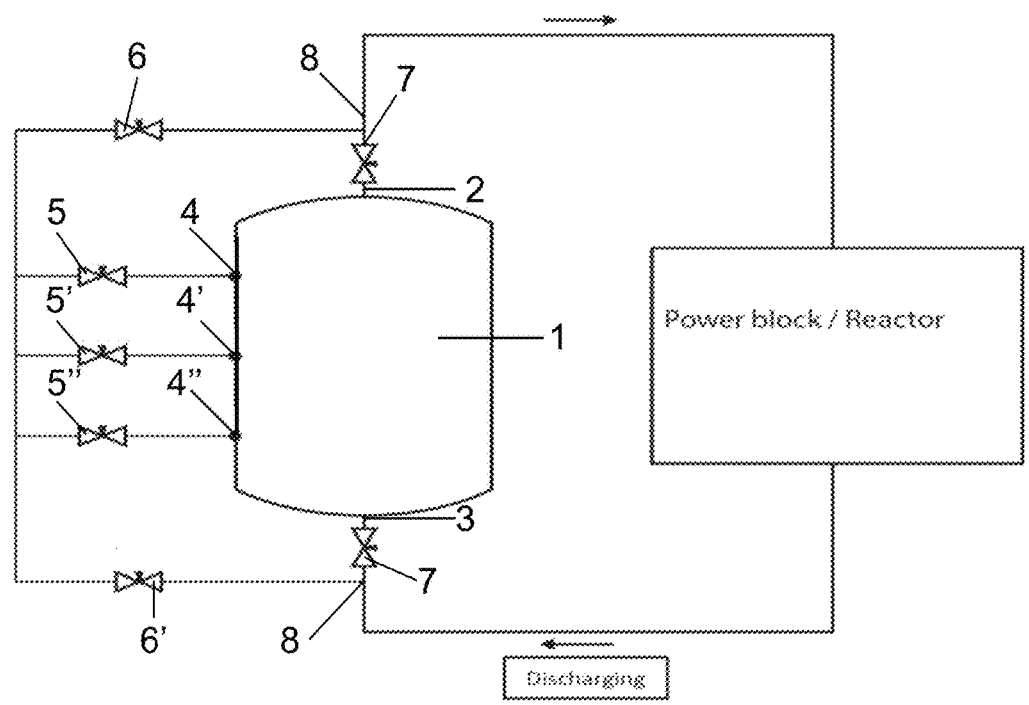
Figure 11:
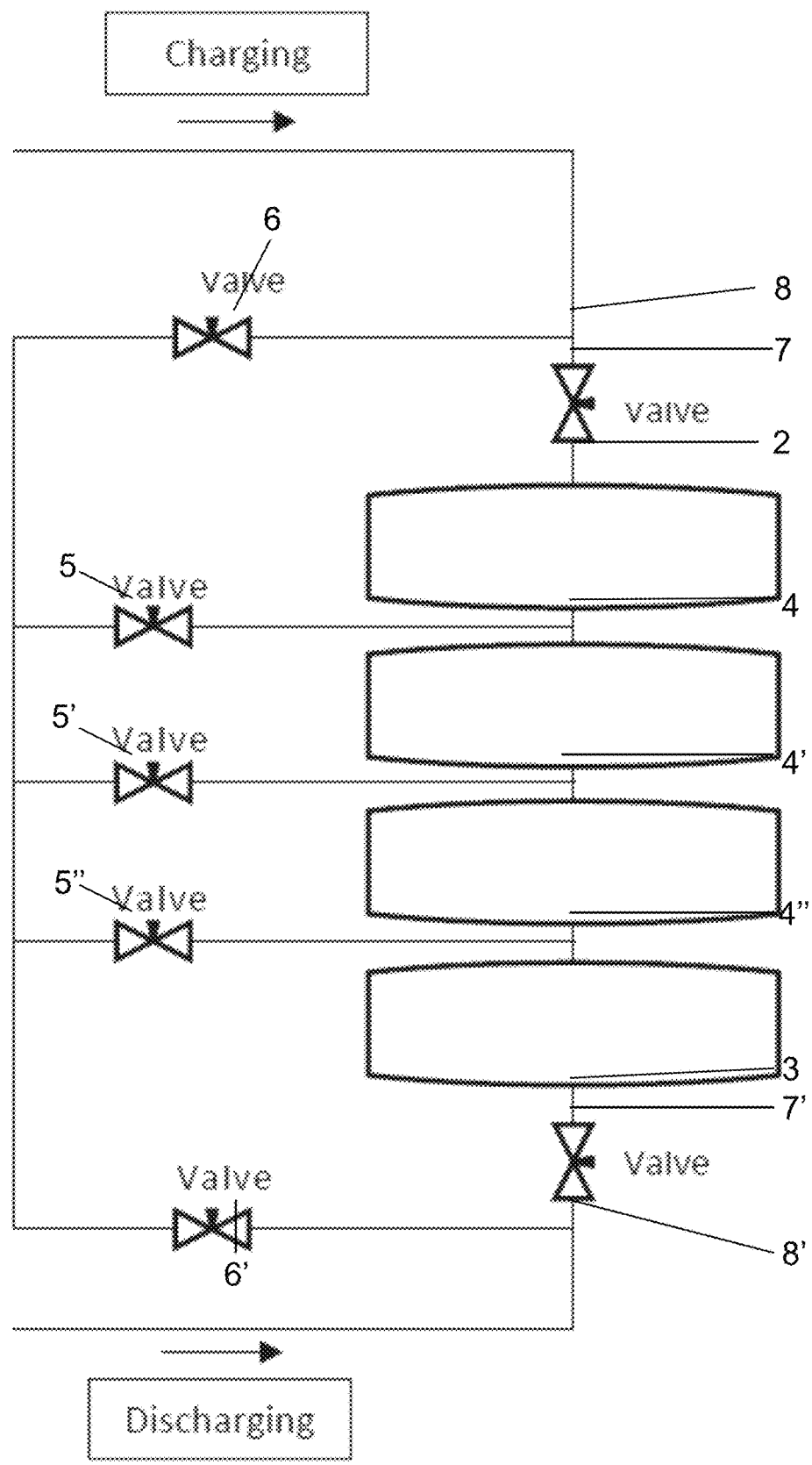
FIG. 11 shows a thermal energy storage device during charging and discharging according to an embodiment of the present invention, comprising three tanks (1) for holding a body of heat transfer fluid, having one upper opening (2) for adding a heat transfer fluid to the body of heat transfer fluid during charging and for removing a heat transfer fluid from the body of heat transfer fluid during discharging, having one lower opening (3) for removing a heat transfer fluid from the lower temperature region of the body of heat transfer fluid during charging and adding a heat transfer fluid to the body of heat transfer fluid during discharging, having three intermediate openings (4, 4', 4") for removing a heat transfer fluid from the body of heat transfer fluid during charging or discharging and each being arranged between adjoining tanks, and three valves (5, 5', 5") capable of adjusting the flow rate through the three intermediate openings during charging and discharging, as well as two valves (6, 6') that allow to selectively fluidly connect the intermediate openings with the upper or lower opening via the conduits or to bypass the tanks, and two valves (7, 7') capable of adjusting the flow through the upper and lower openings (2, 3). During charging, valve (7) is open, valve (6) is closed and valve (6') is open, and valves (5, 5', 5") are individually and successively opened as the thermocline region moves downwards and past intermediate openings (4, 4', 4") to remove heat transfer fluid from the thermocline region and combine it with heat transfer fluid being removed from the lower temperature region via lower opening (3). By controlling the flow across valves (5, 5', 5") and valve (7'), the temperature of the heat transfer fluid downstream of intersection (8') resulting from the combination of the heat transfer fluid from the thermocline region and the lower temperature region of the body of heat transfer fluid can be controlled. During discharging, valve (7') is open, valve (6') is closed and valve (6) is open, and valves (5, 5', 5''') are individually and successively opened as the thermocline region moves upwards and past intermediate openings (4, 4', 4") to remove heat transfer fluid from the thermocline region and combine it with heat transfer fluid being removed from the upper temperature region via upper opening (2). By controlling the flow across valves (5, 5', 5") and valve (7), the temperature of the heat transfer fluid downstream of intersection (8) resulting from the combination of the heat transfer fluid from the thermocline region and the upper temperature region of the body of heat transfer fluid can be controlled. In each case, arrows indicate the direction of flow of heat transfer fluid.

In the context of the present invention, the term "charging" of the thermal energy storage device means that heat transfer fluid having a temperature above an upper threshold temperature is added to the body of heat transfer fluid and conversely, the term "discharging" of the thermal energy storage device means that heat transfer fluid having a temperature below an lower threshold temperature is added to the body of heat transfer fluid.

It is an object of the present invention to provide a method of operating a thermal energy storage device comprising a body of heat transfer fluid, said body of heat transfer fluid comprising an upper temperature region comprising heat transfer fluid having a temperature above a upper threshold temperature, a lower temperature region comprising heat transfer fluid having a temperature below a lower threshold temperature and a thermocline region separating the upper and lower temperature regions and comprising heat transfer fluid having a temperature above a lower threshold temperature and below an upper threshold temperature, wherein during charging of the thermal energy storage device, heat transfer fluid is removed from the thermocline region of the body of heat transfer fluid and when the temperature of the heat transfer fluid being removed from the thermocline region of the body of heat transfer fluid rises above a maximum temperature, said heat transfer fluid being removed is brought to a temperature equal to or below said maximum temperature, wherein the maximum temperature is above the lower threshold temperature and/or wherein during discharging of the thermal energy storage device, heat transfer fluid is removed from the thermocline region of the body of heat transfer fluid and when the temperature of the heat transfer fluid being removed from the thermocline region of the body of heat transfer fluid falls below a minimum temperature, said heat transfer fluid being removed is brought to a temperature equal to or above said minimum temperature, wherein said minimum temperature is below the upper threshold temperature. In most cases, upper temperature region comprising heat transfer fluid having a temperature above a upper threshold temperature and the lower temperature region comprising heat transfer fluid having a temperature below a lower threshold temperature are separated by an thermocline region, in vertical direction, i.e. the upper temperature region is located above the thermocline region and the lower temperature region is located below the thermocline region. During charging of the thermal energy storage device, heat transfer fluid being removed from the thermocline region is brought to a temperature equal to or below said maximum temperature by for example directing said fluid into a heat exchanger, for example, i.e. without combining or mixing said fluid to a fluid having a lower temperature and one a temperature equal to or below said maximum temperature is reached, said fluid is then thermally contacted with a system capable of converting the thermal energy into another type of energy such as for example a heat engine.

It is understood that in general, the openings in the thermal energy storage device can be in any form and preferably are in the form of ports, and more preferably are ports which can be controlled with respect to the flow rate. Ports can be controlled with respect to the flow rate by equipping the ports directly with valves or placing valves downstream of the port.

It is further understood that in general, the thermal energy storage device can be equipped with one or more temperature sensors, either separately placed in vertical direction of the tank of the thermal energy storage or integrated into the openings of the thermal energy storage device.

It is further understood that in general, the openings which can be controlled with respect to the flow rate and the temperature sensors are connected and can be controlled by a control unit of the thermal energy storage device, which control unit is capable of carrying out the method according to the present invention.

It is moreover understood that in general, the heat transfer fluid being removed from the thermocline region of the body of heat transfer fluid during charging and/or discharging may or may not be returned to the body of heat transfer fluid, and may be returned either directly or indirectly. In some embodiments, the heat transfer fluid being removed from the thermocline region during charging may be returned to the upper temperature region of the body of heat transfer fluid whereas the heat transfer fluid being removed from the thermocline region during discharging may be returned to the lower temperature region of the body of heat transfer fluid. In general, before the heat transfer fluid being removed from the thermocline region is returned to the body of heat transfer fluid, the heat transfer fluid may be directed to a device capable of using or upgrading the thermal energy comprised in the heat transfer fluid being removed from the thermocline region, such as for example a solar thermal collector or a solar receiver in the case of charging.

In one preferred embodiment, the thermal storage device suitable for use in a method of operating a thermal energy storage device comprises a tank for holding the body of heat transfer fluid, which tank is equipped with at least one upper opening for allowing the heat transfer fluid having a temperature above the upper threshold temperature to be added to the upper temperature region of the body of heat transfer fluid comprising heat transfer fluid having a temperature above a upper threshold temperature for example during charging of the thermal storage device. Consequently, during discharging of the thermal storage device, the at least one upper opening is used for allowing the heat transfer fluid having a temperature above the upper threshold temperature to be removed from the upper temperature region of the body of heat transfer fluid comprising heat transfer fluid having a temperature above a upper threshold temperature. The tank may also comprise a plurality upper openings, which upper openings may preferably be arranged at the same height in vertical direction or in direction of flow of the heat transfer fluid being added or removed.

In one preferred embodiment, the thermal storage device suitable for use in a method of operating a thermal energy storage device comprises a tank for holding the body of heat transfer fluid, which tank is equipped with at least one lower opening for allowing the heat transfer fluid having a temperature below the lower threshold temperature to be removed from the lower temperature region of the body of heat transfer fluid comprising heat transfer fluid having a temperature below a lower threshold temperature for example during charging of the thermal storage device. Consequently, during discharging of the thermal storage device, the at least one lower opening is used for allowing the heat transfer fluid having a temperature below the lower threshold temperature to be added to the lower temperature region of the body of heat transfer fluid comprising heat transfer fluid having a temperature below a lower threshold temperature. The tank may also comprise a plurality of lower openings, which lower openings may preferably be arranged at the same height in vertical direction or in direction of flow of the heat transfer fluid being added or removed.

In one preferred embodiment, the thermal storage device suitable for use in a method of operating a thermal energy storage device comprises a tank for holding the body of heat transfer fluid, which tank is equipped with at least one intermediate opening for allowing the heat transfer fluid having a temperature below the upper threshold temperature and above the lower threshold to be removed from of the thermocline region of the body of heat transfer fluid. The tank may also comprise a plurality of intermediate openings between upper and lower openings, preferably one, two, three or four intermediate openings which are preferably arranged in vertical direction or in direction of flow of the heat transfer fluid being added or removed and are more preferably evenly spaced. When the tank comprises a plurality of intermediate openings, it becomes possible to remove heat transfer fluid at different levels in vertical direction as the thermocline travels from one side of the tank to the other during charging and discharging, thereby increasing the efficiency with which the thermocline width can be controlled.

The present invention is not limited to a method of operating a thermal energy storage device comprising a single tank comprising the body of heat transfer fluid. In thermal energy storage devices comprising a plurality of tanks, individual tanks are fluidly connected to each other via conduits and the intermediate openings are preferably located at the conduits fluidly connecting adjoining tanks. In one embodiment of the thermal energy storage device, the intermediate openings in the conduits fluidly connecting adjoining tanks are T-joints and/or so are the intersections.

The present invention is not limited to a method of operating a thermal energy storage device of a particular kind. For instance, both tank and heat transfer fluid may vary depending on the particular need of the system thermally associated with the thermal energy storage device. Exemplary heat transfer fluids may be water, aqueous solutions, molten salts and gases such as nitrogen, carbon dioxide or air. The heat transfer fluid may be in any state, provided it can flow, i.e. the heat transfer fluid may be a liquid, a gas or even a fluid in a supercritical state such as for example supercritical carbon dioxide. Exemplary tanks can be formed of metal, ceramic or stone or may be cavities in rock formations. The tank may or may not be equipped with an outer insulating layer. The upper threshold temperature and the lower threshold temperature are not particularly limited and can be chosen freely as required by the particular system thermally connected to the heat storage device within the thermal limitations of the heat storage device and the heat transfer fluid.

For instance, in the case where the system is a system capable of converting the thermal energy into chemical energy such as for example a thermochemical fuel synthesis system based on a redox system, and preferably on a redox system of metal oxides such as the cerium(IV) oxide-cerium (III) oxide cycle or the iron oxide cycle or the zinc-zinc oxide cycle, the heat transfer fluid is preferably a gas such as an inert gas, carbon dioxide, steam, nitrogen or air or a supercritical fluid. Using a gas or a supercritical fluid that can easily flow without significant back pressure in a thermochemical fuel synthesis system allows to achieve a higher fuel yield because the metal oxide is often in the form of a porous structure such as high-surface packed beds or solid foams or the metal oxide is encapsulated in, e.g, tubes. Typical reduction temperatures are between 1100° C. and 1500° C. and the typical oxidation temperatures are between 800° C. and 1100° C.

Consequently, in a preferred method of operating a thermal energy storage device comprising a body of heat transfer fluid, said body of heat transfer fluid comprising an upper temperature region comprising heat transfer fluid having a temperature above a upper threshold temperature, a lower temperature region comprising heat transfer fluid having a temperature below a lower threshold temperature and a thermocline region separating the upper and lower temperature regions and comprising heat transfer fluid having a temperature above a lower threshold temperature and below an upper threshold temperature, the heat transfer fluid is a gas such as inert gas or air in subcritical, critical or supercritical state, wherein during charging of the thermal energy storage device, heat transfer fluid is removed from the thermocline region of the body of heat transfer fluid and when the temperature of the heat transfer fluid being removed from the thermocline region of the body of heat transfer fluid rises above a maximum temperature, said heat transfer fluid being removed is brought to a temperature equal to or below said maximum temperature, wherein the maximum temperature is above the lower threshold temperature and wherein the temperature equal to or below said maximum temperature corresponds to a temperature at which an oxidation of a metal oxide participating in a thermochemical cycle is achieved such as for example to split water or carbon dioxide, and/or wherein during discharging of the thermal energy storage device, heat transfer fluid is removed from the thermocline region of the body of heat transfer fluid and when the temperature of the heat transfer fluid being removed from the thermocline region of the body of heat transfer fluid falls below a minimum temperature, said heat transfer fluid being removed is brought to a temperature equal to or above said minimum temperature, wherein said minimum temperature is below the upper threshold temperature and wherein the temperature equal to or above said minimum temperature corresponds to a temperature at which a reduction of a metal oxide participating in a thermochemical cycle is achieved such as for example to release oxygen and reduce the metal oxide to a non-stochiometric state. As an exemplary embodiment, in the case where thermochemical cycle is based on the cerium(IV) oxide-cerium(III) oxide cycle, the typical reduction temperatures are between 1100° C. and 1500° C. and the typical oxidation temperatures are between 800° C. and 1100° C. In particular in the case of thermochemical cycles utilizing porous structures such as foams of metal oxides as substrate, which are monolithic in opposition to packed bed substrates, it is advantageous to reduce temperature fluctuations in order to reduce the mechanical strain resulting from thermal expansion. When using the method of the present invention, the mechanical strain can be reduced to a minimum because the temperature of the heat transfer fluid being removed can be controlled while at the same time increasing the utilization factor of the thermal energy storage device. It should be noted that the heat transfer fluid having a temperature at which an oxidation of a metal oxide and/or a reduction of the metal oxide can be achieved can be contacted directly with a porous structure comprising a metal oxide capable of thermochemical fuel synthesis, provided it comprises either water or carbon dioxide or both, which then are split using the porous structure comprising a metal oxide capable of thermochemical fuel synthesis. Alternatively, the thermal energy can be transferred across a metal casing such as tubing enclosing single monoliths of porous metal oxide structure and impeding direct contact of the single monoliths of porous metal oxide structure with the heat transfer fluid. In order to carry out the thermochemical fuel synthesis, a flow of fluid comprising either water or carbon dioxide or both is guided across the lumen of the tubing when the temperature corresponds to an oxidation temperature of the metal oxide for splitting water or carbon dioxide.

LIST OF REFERENCE SIGNS

| | |
|---|---|
| 1 | Tank |
| 2 | Upper opening |
| 3 | Lower opening |
| 4 | Intermediate opening |
| 5 | Valve |
| 6 | Valve |
| 7 | Valve |
| 8 | Intersection |

The invention claimed is:

1. A method of charging and discharging a thermal energy storage device comprising a tank, the tank comprising a body of heat transfer fluid and a packed bed of solids, said body of heat transfer fluid comprising an upper temperature region comprising heat transfer fluid having a temperature above a upper threshold temperature, a lower temperature region comprising heat transfer fluid having a temperature below a lower threshold temperature and a thermocline region separating the upper and lower temperature regions and comprising heat transfer fluid having a temperature above a lower threshold temperature and below an upper threshold temperature, wherein during charging of the thermal energy storage device, heat transfer fluid is removed from the thermocline region of the body of heat transfer fluid and when the temperature of the heat transfer fluid being removed from the thermocline region of the body of heat transfer fluid rises above a maximum temperature, said heat transfer fluid being removed is brought to a temperature equal to or below said maximum temperature by combining the heat transfer fluid being removed and having a temperature above a maximum temperature with heat transfer fluid having a temperature below the lower threshold temperature, which heat transfer fluid having a temperature below the lower threshold temperature is sourced from the lower temperature region of the body of heat transfer fluid, wherein the maximum temperature is above the lower threshold temperature and wherein during discharging of the thermal energy storage device, heat transfer fluid is removed from the thermocline region of the body of heat transfer fluid and when the temperature of the heat transfer fluid being removed from the thermocline region of the body of heat transfer fluid falls below a minimum temperature, said heat transfer fluid being removed is brought to a temperature equal to or above said minimum temperature by combining the heat transfer fluid being removed and having a temperature below a minimum temperature with heat transfer fluid having a temperature above the upper threshold temperature, which heat transfer fluid is sourced from the upper temperature region of the body of heat transfer fluid, wherein said minimum temperature is below the upper threshold temperature.

2. The method of charging and discharging a thermal energy storage device comprising a body of heat transfer fluid according to claim 1, wherein during charging of the thermal energy storage device, the heat transfer fluid being removed from the thermocline region of the body of heat transfer fluid and having a temperature above a maximum temperature is brought to a temperature equal to or below said maximum temperature by combining the heat transfer fluid being removed and having a temperature above a maximum temperature with heat transfer fluid having a temperature below the lower threshold temperature by adjusting the flow rate of either heat transfer fluids being combined, and/or wherein during discharging of the thermal energy storage device, the heat transfer fluid being removed from the thermocline region of the body of heat transfer fluid and having a temperature below a minimum temperature is brought to a temperature equal to or above said minimum temperature by combining the heat transfer fluid being removed with heat transfer fluid having a temperature above the upper threshold temperature by adjusting the flow rate of either heat transfer fluids being combined.

3. The method of charging and discharging a thermal energy storage device comprising a body of heat transfer fluid according to claim 2, wherein during charging of the thermal energy storage device, the flow rate of the heat transfer fluid being removed from the lower temperature region having a temperature below the lower threshold temperature is lower than the flow rate of heat transfer fluid being added to the upper temperature region having a temperature above an upper threshold temperature, and/or wherein during discharging of the thermal energy storage device, the flow rate of the heat transfer fluid being removed from the upper temperature region having a temperature above the upper threshold temperature is lower than the flow rate of heat transfer fluid being added to the lower temperature region having a temperature below a lower threshold temperature.

4. The method of charging and discharging a thermal energy storage device comprising a body of heat transfer fluid according to claim 3, wherein during charging of the thermal energy storage device, the heat transfer fluid being removed from the thermocline region of the body of heat transfer fluid and having a temperature above a maximum temperature is brought to a first set point temperature being equal to or below the maximum temperature and is then brought to a second set point temperature equal to or below the maximum temperature, under proviso that the first and second set point temperature are different, and/or wherein during discharging of the thermal energy storage device, the heat transfer fluid being removed from the thermocline region of the body of heat transfer fluid and having a temperature below an minimum temperature is brought to a first set point temperature equal to or above the minimum temperature and is then brought to a second set point temperature equal to or above the minimum temperature, under proviso that the first and second set point temperature are different.

5. The method of charging and discharging a thermal energy storage device comprising a body of heat transfer fluid according to claim 3, wherein during charging of the thermal energy storage device, the heat transfer fluid being removed from the thermocline region of the body of heat transfer fluid and having a temperature above a maximum temperature is brought to a temperature being equal to or below the maximum temperature and held at said temperature equal to or below the maximum temperature, and/or wherein during discharging of the thermal energy storage device, the heat transfer fluid being removed from the thermocline region of the body of heat transfer fluid and having a temperature below an minimum temperature is brought to a temperature equal to or above the minimum temperature and is held at said temperature equal to or above the minimum temperature.

6. The method of charging and discharging a thermal energy storage device comprising a body of heat transfer fluid according to claim 2, wherein during charging of the thermal energy storage device, the heat transfer fluid being removed from the thermocline region of the body of heat transfer fluid and having a temperature above a maximum temperature is brought to a first set point temperature being equal to or below the maximum temperature and is then brought to a second set point temperature equal to or below the maximum temperature, under proviso that the first and second set point temperature are different, and/or wherein during discharging of the thermal energy storage device, the heat transfer fluid being removed from the thermocline region of the body of heat transfer fluid and having a temperature below an minimum temperature is brought to a first set point temperature equal to or above the minimum temperature and is then brought to a second set point temperature equal to or above the minimum temperature, under proviso that the first and second set point temperature are different.

7. The method of charging and discharging a thermal energy storage device comprising a body of heat transfer fluid according to claim 6, wherein during charging of the thermal energy storage device, the heat transfer fluid being removed from the thermocline region of the body of heat transfer fluid and having a temperature above a maximum temperature is brought to a temperature being equal to or below the maximum temperature and held at said temperature equal to or below the maximum temperature, and/or wherein during discharging of the thermal energy storage device, the heat transfer fluid being removed from the thermocline region of the body of heat transfer fluid and having a temperature below an minimum temperature is brought to a temperature equal to or above the minimum temperature and is held at said temperature equal to or above the minimum temperature.

8. The method of charging and discharging a thermal energy storage device comprising a body of heat transfer fluid according to claim 2, wherein during charging of the thermal energy storage device, the heat transfer fluid being removed from the thermocline region of the body of heat transfer fluid and having a temperature above a maximum temperature is brought to a temperature being equal to or below the maximum temperature and held at said temperature equal to or below the maximum temperature, and/or wherein during discharging of the thermal energy storage device, the heat transfer fluid being removed from the thermocline region of the body of heat transfer fluid and having a temperature below an minimum temperature is brought to a temperature equal to or above the minimum temperature and is held at said temperature equal to or above the minimum temperature.

9. The method of charging and discharging a thermal energy storage device comprising a body of heat transfer fluid according to claim 2, wherein during charging of the thermal energy storage device, heat transfer fluid is removed from the thermocline region of the body of heat transfer fluid when the temperature of the heat transfer fluid being removed from the thermocline region of the body of heat transfer fluid rises above a maximum temperature, said heat transfer fluid being removed is brought to a temperature equal to or below said maximum temperature, wherein the maximum temperature is above the lower threshold temperature and wherein the said procedure is subsequently repeated one or more times during charging, and is subsequently repeated one or more times until the heat transfer fluid having a temperature below the lower threshold temperature is essentially depleted and/or wherein during discharging of the thermal energy storage device, heat transfer fluid is removed from the thermocline region of the body of heat transfer fluid and when the temperature of the heat transfer fluid being removed from the thermocline region of the body of heat transfer fluid falls below a minimum temperature, said heat transfer fluid being removed is brought to a temperature equal to or above said minimum temperature, wherein the minimum temperature is below the upper threshold temperature and wherein said procedure is subsequently repeated one or more times during discharging, and is subsequently repeated one or more times until the heat transfer fluid having a temperature above the upper threshold temperature is essentially depleted.

10. The method of charging and discharging a thermal energy storage device comprising a body of heat transfer fluid according to claim 1,
wherein during charging of the thermal energy storage device, the flow rate of the heat transfer fluid being removed from the lower temperature region having a temperature below the lower threshold temperature is lower than the flow rate of heat transfer fluid being added to the upper temperature region having a temperature above an upper threshold temperature, and/or
wherein during discharging of the thermal energy storage device, the flow rate of the heat transfer fluid being removed from the upper temperature region having a temperature above the upper threshold temperature is lower than the flow rate of heat transfer fluid being added to the lower temperature region having a temperature below a lower threshold temperature.

11. The method of charging and discharging a thermal energy storage device comprising a body of heat transfer fluid according to claim 1,
wherein during charging of the thermal energy storage device, the heat transfer fluid being removed from the thermocline region of the body of heat transfer fluid and having a temperature above a maximum temperature is brought to a first set point temperature being equal to or below the maximum temperature and is then brought to a second set point temperature equal to or below the maximum temperature, under proviso that the first and second set point temperature are different, and/or
wherein during discharging of the thermal energy storage device, the heat transfer fluid being removed from the thermocline region of the body of heat transfer fluid and having a temperature below an minimum temperature is brought to a first set point temperature equal to or above the minimum temperature and is then brought to a second set point temperature equal to or above the minimum temperature, under proviso that the first and second set point temperature are different.

12. The method of charging and discharging a thermal energy storage device comprising a body of heat transfer fluid according to claim 1,
wherein during charging of the thermal energy storage device, the heat transfer fluid being removed from the thermocline region of the body of heat transfer fluid and having a temperature above a maximum temperature is brought to a temperature being equal to or below the maximum temperature and held at said temperature equal to or below the maximum temperature, and/or
wherein during discharging of the thermal energy storage device, the heat transfer fluid being removed from the thermocline region of the body of heat transfer fluid and having a temperature below an minimum temperature is brought to a temperature equal to or above the minimum temperature and is held at said temperature equal to or above the minimum temperature.

13. The method of charging and discharging a thermal energy storage device comprising a body of heat transfer fluid according to claim 1,
wherein during charging of the thermal energy storage device, heat transfer fluid is removed from the thermocline region of the body of heat transfer fluid when the temperature of the heat transfer fluid being removed from the thermocline region of the body of heat transfer fluid rises above a maximum temperature, said heat transfer fluid being removed is brought to a temperature equal to or below said maximum temperature, wherein the maximum temperature is above the lower threshold temperature and wherein the said procedure is subsequently repeated one or more times during charging, and is subsequently repeated one or more times until the heat transfer fluid having a temperature below the lower threshold temperature is essentially depleted and/or
wherein during discharging of the thermal energy storage device, heat transfer fluid is removed from the thermocline region of the body of heat transfer fluid and when the temperature of the heat transfer fluid being removed from the thermocline region of the body of heat transfer fluid falls below a minimum temperature, said heat transfer fluid being removed is brought to a temperature equal to or above said minimum temperature, wherein the minimum temperature is below the upper threshold temperature and wherein said procedure is subsequently repeated one or more times during discharging, and is subsequently repeated one or more times until the heat transfer fluid having a temperature above the upper threshold temperature is essentially depleted.

14. The method of charging and discharging a thermal energy storage device comprising a body of heat transfer fluid according to claim 1, wherein the heat transfer fluid is a fluid in gaseous, liquid, or supercritical state.

15. The method of charging and discharging a thermal energy storage device according to claim 1, wherein the thermal energy storage is thermally connected, such as to allow an exchange of thermal energy,
to a system capable of at least partially converting thermal energy comprised in heat transfer fluid having a temperature equal or below the maximum outflow temperature during charging and/or having a temperature equal to or above the minimum outflow temperature during discharging into another form of energy, wherein the system is capable of converting the thermal energy into mechanical energy or chemical energy, and/or
to a system capable of increasing the thermal energy comprised in the heat transfer fluid having a temperature equal or below the maximum outflow temperature during charging and/or decreasing the thermal energy comprised in the heat transfer fluid having a temperature equal to or above the minimum outflow temperature during discharging.

16. The method of charging and discharging a thermal energy storage device comprising a body of heat transfer fluid according to claim 1,
wherein during charging of the thermal energy storage device, the heat transfer fluid having a temperature above the maximum temperature being removed from the body of heat transfer fluid is brought to a temperature equal to or below the maximum temperature before being thermally contacted with the system capable of at least partially converting thermal energy or increasing the thermal energy comprised in heat transfer fluid having a temperature equal to or below the maximum temperature, and/or
wherein during discharging of the thermal energy storage device, the heat transfer fluid having a temperature below the minimum temperature being removed from the body of heat transfer fluid is brought to a temperature equal to or above the minimum before being thermally contacted with the system capable of at least partially converting thermal energy or decreasing the thermal energy comprised in heat transfer fluid having a temperature equal to or above the minimum temperature.

17. The method of charging and discharging a thermal energy storage device according to claim 1, wherein the thermal energy storage is thermally connected, such as to allow an exchange of thermal energy,
- to a system capable of at least partially converting thermal energy comprised in heat transfer fluid having a temperature equal or below the maximum outflow temperature during charging and/or having a temperature equal to or above the minimum outflow temperature during discharging into another form of energy, wherein the system is capable of converting the thermal energy into mechanical energy or chemical energy, and/or
- to a system capable of increasing the thermal energy comprised in the heat transfer fluid having a temperature equal or below the maximum outflow temperature during charging and/or decreasing the thermal energy comprised in the heat transfer fluid having a temperature equal to or above the minimum outflow temperature during discharging.

\* \* \* \* \*